United States Patent [19]
Andersson et al.

[11] 4,109,060
[45] Aug. 22, 1978

[54] POROUS ELECTRODE FOR A CHEMO-ELECTRIC CELL AND A METHOD OF PREPARING THE SAME

[75] Inventors: Bo Eric Christer Andersson, Täby; Lars Ivar Carlsson; Rolf Christer Roland Johnsson, both of Åkersberga, all of Sweden

[73] Assignee: Svenska Utvecklingsaktiebolaget (SU) Swedish National Development Co., Stockholm, Sweden

[21] Appl. No.: 747,317

[22] Filed: Dec. 3, 1976

[30] Foreign Application Priority Data

Dec. 8, 1975 [SE] Sweden ............................... 7513813

[51] Int. Cl.² ............................................... B27F 3/00
[52] U.S. Cl. ...................................... 425/566; 75/200; 75/211; 75/213; 75/222; 204/284
[58] Field of Search ................. 75/200, 222, 213, 211, 75/0.5 R; 428/566; 204/284

[56] References Cited

U.S. PATENT DOCUMENTS

| 2,538,992 | 1/1951 | Trask | 75/213 |
| 2,671,953 | 3/1954 | Balke | 75/213 |
| 2,672,415 | 3/1954 | Balke | 75/213 |
| 2,794,735 | 6/1957 | Schlecht et al. | 75/213 |
| 2,833,645 | 5/1958 | Erasmeus | 75/213 |
| 3,397,057 | 8/1968 | Harrington et al. | 75/213 |
| 3,847,603 | 11/1974 | Fukuda et al. | 75/221 |

Primary Examiner—Brooks H. Hunt
Attorney, Agent, or Firm—Burns, Doane, Swecker & Mathis

[57] ABSTRACT

The invention relates to a porous electrode for a chemo-electric cell, which electrode comprises sintered porous grains which in turn are sintered together to a porous, coherent electrode body having a double structure, i.e. a well defined difference as to pore size between and within the grains, respectively. The invention also relates to a method of preparing said electrode as well as to a chemo-electric cell containing the electrode.

59 Claims, 2 Drawing Figures

POROUS ELECTRODE FOR A CHEMO-ELECTRIC CELL AND A METHOD OF PREPARING THE SAME

The present invention relates to a porous electrode for a chemo-electric cell, which electrode comprises reduced and sintered particles of an active electrode material, such as iron, and to a method of preparing said porous electrode. The invention also relates to a chemo-electric cell containing said porous electrode as well as to a method of preparing a porous metal powder.

Electrodes for alkaline cells are prepared in many different ways. As the anode material there is used zinc, cadmium or iron. However, zinc has great solubility in the electrolyte which means that the life of zinc electrodes is limited, while cadmium is an expensive and toxic material of limited resource, which means that it is not suited for an extensive use. In view of this, iron, which has been used since the beginning of the 20th century, in pure form or in admixture with cadmium, is being used in increasing proportions in these connections, especially as it has been possible more recently to eliminate several of the weaknesses of the iron electrode, principally by a change-over to sintered electrodes and by additives for the improvement of the conductivity and the low temperature properties.

As an example of the preparation of sintered, porous iron electrodes reference could be made to the process disclosed in U.S. Pat. No. 3,802,878. According to said process, porous electrodes are manufactured by pressing and sintering carbonyl iron powder and the manufactured electrodes have shown to be well suited for use in for instance different alkaline cells and not least as electrodes in a metal-air battery. A metal-air battery is a half-way step between a fuel cell and a conventional accumulator. The metal-air battery employs an invariant air cathode which reduces the atmosphere oxygen, and a conventional metal electrode, for example an iron anode, which is oxidized on discharge in the same way as the negative electrode in an alkaline accumulator. As starting materials for the preparation of electrodes of this kind iron compounds, principally oxides have also been used, which are converted into iron in the metallurgical or electro-chemical ways. Thus, for certain purposes the use of iron oxide as a starting material has turned out to give electrodes having improved properties. Examples of this preparation of iron electrodes are those method which are disclosed in German patent specification No. 958,338 and German Offenlegungsschrift No. 2,262,443.

Furthermore, French Patent Specification No. 1,427,244 and a corresponding U.S. Pat. No. 3,323,951 disclose that prior art isolated pocket pattern structure can be improved by special techniques which lead to a structure with intercommunicating interstitial spaces. However, the structure discussed in said Patent Specifications and shown in FIG. 3 thereof is not any double structure as that obtained according to the present invention, which will be described more closely below. It is true that FIG. 2 of the patent specifications shows a structure with spherical particles but as is clearly stated, the perfect spherical shape merely represents a hypothetical case the purpose of which is to visualize the nature of the intercommunicating spaces as compared to the nature of isolated pockets. Thus, it is clearly stated that the shapes apt to be encountered in practice are those which are shown in FIG. 3. Moreover, there is nowhere disclosed that if the structure of FIG. 2 were possible in practice it should impart other properties to the electrode than the structure of FIG. 3; the two structures are said to be rather analogous to each other.

As concerns iron electrodes the electro-chemical conversion is obtained at the first stage: $Fe + 2 OH^- \rightarrow Fe(OH)_2 + 2 e^-$. The formation of the hydroxide causes a deterioration of the conductivity, while at the same time the volume of the electrode material is enhanced, i.e. the porosity is reduced. To be able to recharge the material to pure iron it is required that unexploited material remains throughout the whole skeleton, and some amounts of electrolyte is required to pass away the formed $OH^-$-ions. These desires make different demands on the structure of the skeleton. Thus, the first demand is that the material should be as tight as possible, while the second demand implies as high porosity as possible. Furthermore, to create a good life, it is required that the skeleton shows a very good mechanical strength. The previously known electrodes have not in a satisfactory way shown a favourable combination of these properties.

According to the present invention it has shown possible to provide a porous electrode of the type which has previously been obtained from an iron oxide but with markedly improved properties. In this context the most valuable feature of the invention is that the electrode can fulfill practically all of the above-mentioned demands at the same time, i.e. a demand on a material that is as tight as possible as well as a demand on as high porosity as possible, which demands seem contradictory to each other. Thus, at the same time the electrode according to the invention shows such properties as high density of capacity, good reproducibility of the charging and discharging courses, as well as a very good life. Moreover, through good powder properties, compactability properties and sintering properties the manufacturing process is essentially facilitated. This is obtained by those features of the electrode as well as of the process according to the invention which are disclosed in the accompanying claims.

Thus, in accordance with the present invention, there is provided an electrode having a completely new structure, viz. some sort of a double structure with two different forms (sizes) of porosity. The electrode according to the invention comprises porous grains composed of sintered together particles of the active electrode material, which grains in turn are sintered together to a porous, coherent electrode body. Through the fact that the porous grains have a relatively uniform or homogeneous size the sintering together of said grains has not caused any substantial filling up of the space, i.e. the pores, between the sintered grains, which in turn means that the pores within the electrode body (between the grains) on an average are larger than the pores within the grains. In other words the ratio between the average size of the pores within the electrode body and the average size of the pores within the grains is higher than 1:1. For the sake of simplicity these different average pore sizes will in some cases below be termed macropores (between the grains) and micropores (within the grains) respectively. The term "size" generally refers to diameter, since in most cases the grains have a spherical shape, but since the spherical shape is not critical to the invention, the term "size" in some cases simply relates to the largest extension of length in any direction.

To obtain the best possible properties of the electrode according to the invention the ratio between the macropore size and the micropore size should not exceed 40:1. Preferably said ratio is within the range from 2:1 – 40:1.

When using iron oxide as a reducible compound it has turned out preferable to use particles having a size (largest extension of length) below 10 μm, preferably below 3 μm and most preferably ranging from 0.05 – 1.0 μm. This means that in order to obtain the above-mentioned ratio between macro and micro average pore size an electrode is formed which has macropores ranging from 5 – 20 μm, while the size of the micropores is above 0.1 μm and below 5 μm, preferably below 2.5 μm.

As was mentioned above the new double structure according to the invention is obtained by forming grains having a relatively homogeneous size. Now that the idea has been revealed of using a well defined difference between the pores between and within the grains, respectively, it should be easy for a person skilled in the art to decide how much the sizes of the different grains can be varied to avoid a filling up of the spaces between each grain. According to an especially preferable embodiment of the invention grains are formed for which a group comprising at least 70% of the total number of grains have a size where the largest grain is at most twice as large as the smallest one. In the case of the above-mentioned preferable particle sizes grains are formed which have a size somewhere within the range from 1 – 500 μm, a specially preferable range being from 50 – 250 μm. Thus, in the case of the especially preferable embodiment where at least 70% of the grains are of essentially the same size, the deviation of size for grains having a size of 150 μm must not exceed ∓50 μm.

An essential feature of the method according to the invention for the preparation of an electrode having a double structure is that the above-mentioned grains are formed before the reduction which is utilized to reduce the iron compound, preferable an iron oxide, into iron. According to the invention the grains may be formed by mixing the particles of the reducible compound with a binding agent and shaping them to the desired size. In this context, the simpliest way of having the particles adhered together into grains is to utilize damped atmosphere, whereby the particles are adhered to each other. Otherwise, binding agent may be added, such as water, polyvinyl alcohol, methyl cellulose and/or carbowax. There are different ways of converting the mixture into grains of suitable size. Preferable methods involve caking of the mixture with subsequent sieving or granulation from a slurry by means of spray drying. When sieving, a suitable sieve fraction is taken out and the under-fraction is reprocessed while at spray-drying a homogeneous fraction is obtained directly from the process.

In connection with the preparation of the porous grains a preferable embodiment involves the use of a so-called spacer-forming material, for instance ammonium carbonate, in order to improve or modify the formation of pores within the grains. For further information on demands wich could be made on spacer-forming materials, which are also termed pore-formers, reference is made to the U.S. Pat. No. 3,802,878 which is hereby incorporated by reference. Thus, the invention is not critical with reference to the choice of spacer-forming materials or to those conditions which are used when said materials are treated, but in this respect the known technique is utilized. However, the new feature of the present invention is that the spacer-forming material is utilized for the purpose of defining the pore distribution within as well as between the grains.

When using the above-mentioned binding agents the particles within each separate grain are so strongly adhered together that they do not fall apart at the continued treatment. Therefore, in many cases there is needed no further structure stabilization of the grains. For certain purposes, especially when a very good mechanical strength is required, or when using other binders, it can be suitable according to a preferable embodiment of the invention, to further stabilize the obtained grain structure by heating the formed grains in air or an inert atmosphere at a temperature within the range from 600° – 1200° C, preferably from 850° – 1100° C. In this way the particles within each grain will sinter together into grains having a very good mechanical strength.

The fact that grains of the above-mentioned type are formed before the heating of the reducible material in a reducing atmosphere for the reduction of the same has unexpectedly shown to give very positive results and advantages as compared to the previously known technique, according to which the reduction is performed on a powder bed. Thus, firstly the thickness of the powder bed to be reduced is limited at hydrogen reduction and low temperature. The use according to the invention of grains having a uniform size distribution causes a very uniform reduction. Secondly, there is obtained within each porous grain a gradient of the degree of reduction which is positive for the continued process. The uniform distribution of the particle size also creates very good conditions for reduction in a fluidized bed. From metallurgical reduction processes it is known that the surface of an iron grain that is reduced will not be sintering active until the surface is completely reduced. Such grains adhere together and a sintered body is formed. On the contrary it has turned out that in accordance with the present invention the particles within each grain will sinter together without appreciable shrinkage and in a way that is controlled, but the grains will not sinter together between themselves. Furthermore, the porosity, the pore distribution and the degree of sintering within each grain can be controlled very carefully, which partly means that a very homogeneous structure can be imparted to the prepared electrode, partly involves possibilities to an extent never suspected of varying the properties of the electrode according to the desired use. Through the fact that the porous grains will not sinter together, the powder need not be ground or crushed after the reduction. In this way one partly avoids to destroy the structure by mechanical influence, partly to impart to the grains such a great activity that the powder will be pyrophoric.

The heating of the reducible compound is performed at a temperature which enables the particles within each grain to sinter together. The temperature is of course dependent on the choice of reducible compound as well as on the period of time for which the heating is performed. Temperatures and times are easily determined by a person skilled in the art, but as concerns the use of iron oxide as a reducible compound a preferable temperature range is 500° – 800° C, most preferably 650° – 750° C. As a reducing atmosphere hydrogen gas is preferably used, and the reduction is preferably performed to a degree of reduction exceeding 90%, preferably above 95%.

The grains obtained at the reduction show unexpectedly good compactability properties, which means that the possibilities of controlling the structure of the compacted plate are very good. Through the fact that the surface of the grains is somewhat jagged, the grains will stick together during the first stage of the pressing operation. During the continued pressing, i.e. as the pressure increases, the grains will be deformed in elastically, whereby a defined difference arises with reference to pore diameter or size between and within the grains, respectively.

This is exactly what is meant with "double structure", and the cavities are termed macro and micro porosities, respectively, as was stated above. However, the compaction pressure must not be too high, because in such a case the grains will be crushed and the structure will get quite another appearance. The ratio between the porosity and the pore size in the macro and micro structures, respectively, is controlled by means of grain size, grain hardness and compaction pressure and is easily determined by a person skilled in the art in each single case. Generally, however, the pressure should not exceed 1000 kp/cm$^2$. To enable the single grains to bind to each other and to obtain a coherent electrode body at the sintering operation, the pressure should not be below 150 kp/cm$^2$. An especially preferable range for the pressure is from 250 - 500 kp/cm$^2$.

At the manufacture in a small scale pressing of a spread powder layer is a simple process, while when manufacturing in a larger scale one can choose a somewhat more continuous method, for instance rolling or any slurry-method. However, the invention is not critical with respect to the method of pressing or compacting, but said pressing can be performed in any conventional manner.

If required, the mechanical and conductivity properties can be further improved by using structural materials, examples of structural materials are iron or other meshes, iron or other metal fibres, perforated plates and similars. The joining between structural materials and active materials can be performed at the pressing operation or at the sintering operation or at any other occasion which is suitable for the specific method referred to.

The sintering of the compacted body is performed at elevated temperatures in an inert or reducing atmosphere. A suitable temperature range for the sintering operation is the same temperature range as has been disclosed above in connection with the reduction step. However, it has unexpectedly turned out that if performing the sintering operation at a temperature below 750° C, preferably within the range from 600° - 750° C, the shrinkage can be kept at a very low level or completely avoided. The elimination of the shrinkage process technically involves very large advantages, as the body can be shaped directly at the compaction stage to exact dimensions, which means that no post-treatment is required.

According to still another preferable embodiment of the invention the electrode contains up to 10% by weight, preferably 2 - 7% by weight based on the total weight of the active electrode material, of sintered copper particles, which have shown to improve the conductivity of the electrode. These copper particles are preferably incorporated into the powder before the grains are formed.

The prepared sintered, porous electrode body is directly useful as a battery electrode. It possesses very good mechanical strength, a high electrical conductivity, not unnecessarily high porosity and large internal surface. Thus, a very essential advantage of the electrode according to the invention is that it can be given a lower total porosity, for instance of the order of size of 55 - 60%, than previously known electrodes of this kind while at the same time very good electrical-chemical properties can be imparted thereto and in this connection it should be noted that the lower porosity means essentially improved mechanical properties.

By creating a variable double-structure it is possible to manufacture electrodes having different properties dependent on the intended application. Through the fact that a gradient of the degree of reduction is obtained within each grain, it is possible to obtain a high internal surface while at the same time the shrinkage of the dimensions of the grains can be retained at a low level.

As mentioned above an iron electrode prepared in accordance with the invention is very well suited as an iron anode in a metal-air battery, but the electrode is, of course, also useful in any alkaline accumulator. Even if the invention has been described with special reference to iron as an electrode material, the inventive idea is, of course, applicable to other electrode materials, for instance nickel or cadmium.

The present invention also relates to a method of manufacturing a metal powder, for instance an iron powder, the essential features of said method being stated in the accompanying claims.

Thus, those grains which are obtained after the formation of reducible metal particles and the reduction of the shaped grains in the above-mentioned way show such a well defined structure and accordingly such valuable properties that at many applications they are preferred in front of metal powders prepared according to the previously known technique.

A process for producing metal powder agglomerates is disclosed in U.S. Pat. No. 3,397,057. Said process is, however, not related to reducible metal compounds as starting materials, and the purpose of the process is only to improve the flow properties of the powder.

The invention will be further described by means of the accompanying figures and the following non-limiting examples.

EXAMPLE 1

Figure 1:
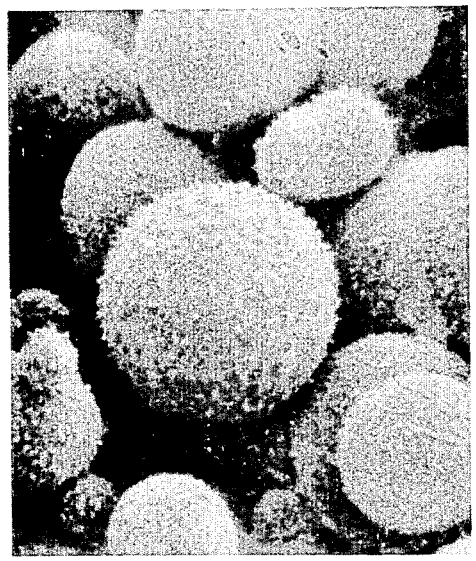
FIG. 1 shows a photo, taken by a scanning electron microscope with a linear magnification of 300 times, of the grains after the reduction step as they are obtained in accordance with the present invention.

A fine-grained synthetic iron oxide of the type $\alpha$—$Fe_2O_3$ and having a particle size below 3 $\mu$m, where the particles were adhered together by the water contents of the oxide which acted as a binder, was screened so that 80% of the grains had a largest diameter within the range from 50 - 250 $\mu$m and that 70% of the grains ranged from 200 $\mp$ 50 $\mu$m. The iron oxide was heat treated at 950° C in air for 30 minutes. The grains were reduced in hydrogen at 700° C to a degree of reduction exceeding 95%, each porous grain obtaining a gradient of degree of reduction where the degree of reduction decreased with the depth of peneration. During the reduction the particles within each grain were sintered together additionally, which meant that the grains were given an increased strength.

The reduced iron powder was spread out and pressed at a pressure of 350 kg/cm$^2$. At said pressure the porous iron grains were deformed while at the same time being adhered together to a durable press body having a good green strength. After sintering in hydrogen atmosphere at a temperature of about 700° C a very durable body was obtained which had a total porosity of about 60% and a BET-surface of about 1 - 1.5 m$^2$/g. The ratio between macro and micro porosities was about 5:1. In this Example as well as in the following Examples the porosities and the average pore diameters were measured by means of mercury porosimetry.

The capacity of a battery electrode manufactured as above was about 1 - 1.2 Ah/cm$^3$ at the discharge from pure iron to two-valent iron hydroxide in 6M potassium hydroxide at room temperature. Moreover, the iron electrode possessed very good charging properties, which means that the degree of over-charge could be kept at a low level and the life was very good.

EXAMPLE 2

A synthetic iron oxide of the type $\alpha$—Fe$_2$O$_3$ and having a particle size below 3 µm was screened to the same grain size as in Example 1. Through the fact that the water contents of the oxide acted as a binder durable grains were obtained.

The reduction, pressing and sintering operations were performed as in Example 1. The ratio between macro and micro porosities was about 2:1. The capacity was of the same magnitude as in Example 1, but the electrode is more suited for slow discharge courses.

EXAMPLE 3

A synthetic iron oxide of the type $\alpha$—Fe$_2$O$_3$ and having a particle size below 3 µm was slurried with a binder in an aqueous solution. The binder was polyvinyl alcohol (Mowiol 30-88 sold by Farbwerke Hoechst). After drying the powder was screened to a fraction where 80% of the grains had a largest diameter within the range from 50 - 250 µm and 70% of the grains had a largest diameter within the range from 200 $\mp$ 50 µm. In this case very durable grains were obtained.

The reduction, pressing and sintering operations were performed as in Example 1. The ratio between macro and micro porosities was about 10:1, while the other electrode data were comparable to those of the electrode according to Example 1 with the exception that the electrode was more suitable for slow discharge courses. In this case the total porosity was about 57%.

EXAMPLE 4

The experiment was performed in the same way as Example 3 with the exception that after the screening operation the powder was heat treated at 950° C in air for 30 minutes. The ratio between macro and micro porosities was somewhat higher than in Example 3. The electrode is suited for somewhat more rapid discharge courses than in Example 3, while the other data were comparable to those from last-mentioned Example.

EXAMPLE 5

A slurry consisting of a synthetic iron oxide of the type $\alpha$—Fe$_2$O$_3$ and having a particle size below 3 µm and water was spray-dried into granules having an average diameter of about 150 µm, of which granules more than 70% had a diameter within the range of 150 $\mp$ 50 µm. In this case grains having rounded surfaces were obtained and the powder had a good flowability.

Figure 2:
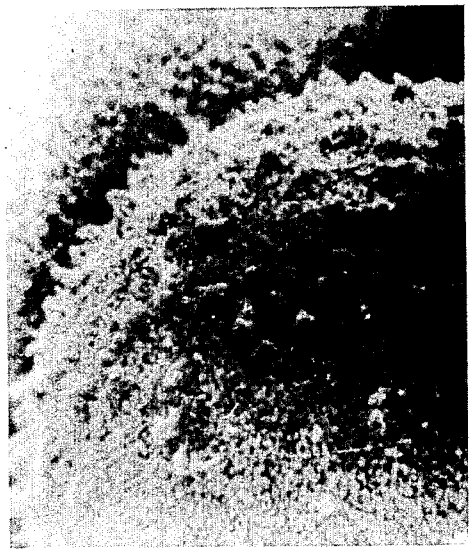
FIG. 2 shows a photo, also taken by a scanning electron microscope but with a linear magnification of 1000 times, of one of the grains from FIG. 1. This photo clearly shows the micropores of the grain.

After the reduction operation, which was performed as in Example 1, the appearance of the grains was that shown in FIGS. 1 and 2. The pressing and sintering operations were then performed in the same way as in Example 1. The ratio between macro and micro porosities was about 20:1, while the capacity was comparable to the capacity of the electrode according to Example 1. The manufactured electrode is especially suited for rapid discharge courses.

EXAMPLE 6

Example 5 was repeated with the exception that in addition to iron oxide and water the slurry also contained the binder polyvinyl alcohol of the same type as in Example 3. The ratio between macro and micro porosities was the same as in Example 5, as were also the data of the electrode.

EXAMPLE 7

Example 6 was repeated with the exception that when forming the grains ammonium carbonate was used as a spacer material. This spacer material was liberated in gaseous form at the drying step.

EXAMPLE 8

An electrode was prepared in the same way as in Example 5 with the exception that after the spray drying the powder was heat treated at 950° C in air for about 30 minutes. The ratio between macro and micro porosities was somewhat higher than in Example 5.

What we claim is:

1. A porous electrode for a chemo-electric cell comprising reduced and sintered particles of an active electrode material wherein the particles of the active electrode material are sintered together to porous grains, which in turn are sintered together to a porous, coherent electrode body having a structure that is built up with inelastically deformed contact areas between the grains and with a well defined ratio between the average size of the pores within the electrode body and the average size of the pores within the grains, which ratio is above 1:1.

2. An electrode according to claim 1, wherein said ratio is at most 40:1.

3. An electrode according to claim 2, wherein said ratio is within the range of 2:1 - 40:1.

4. An electrode according to claim 1, wherein the active electrode material is iron.

5. An electrode according to claim 4, wherein the average size of the pores within the electrode body is within the range of 5 - 20 µm and the average size of the pores within the grains is within the range from 0.1 - 5 µm.

6. An electrode according to claim 5, wherein the average size of the pores within the grains is within a range of 0.5 - 2.5 µm.

7. An electrode according to claim 1 which contains up to 10% by weight, preferably 2 - 7% by weight, based on the total weight of the active electrode material, of sintered copper particles.

8. A porous electrode for a chemo-electric cell comprising reduced and sintered particles of iron as an active electrode material, wherein the particles of the active electrode material are sintered together to porous grains, which in turn are sintered together to a porous, coherent electrode body having a structure that is built up with inelastically deformed contact areas between the grains and with a well defined ratio between the average size of the pores within the electrode body and the average size of the pores within the grains, which ratio is above 1:1 and at most 40:1.

9. In a method of preparing a porous electrode for a chemo-electric cell comprising reduced and sintered together particles of an active electrode material, by starting from particles of a reducible compound and heating the same in a reducing atmosphere for reduction thereof and pressing and sintering the reduced compound into a coherent electrode body, the improvement which comprises forming from the particles, before the heating in a reducing atmosphere, porous grains having a relatively homogeneous size, heating the grains in a reducing atmosphere at the sintering temperature of the electrode material, whereby the particles within each grain sinter together, and pressing and sintering the reduced grains so that they will sinter together to a porous, coherent electrode body having inelastically deformed contact areas between the grains and a ratio between the average size of the pores within the electrode body and the average size of the pores within the grains above 1:1.

10. A method according to claim 9, which comprises forming porous grains, of which a group comprising at least 70% of the total number of grains have a size where the largest grain is at most twice the size of the smallest one.

11. A method according to claim 9, wherein the reducible compound is iron oxide.

12. A method according to claim 11, which comprises forming grains having a size within the range of 1 - 500 μm.

13. A method according to claim 12, which comprises forming grains having a size within the range of 50 - 250 μm.

14. A method according to claim 12, which comprises starting from particles having a size below 10 μm.

15. A method according to claim 14, which comprises starting from particles having a size below 3 μm.

16. A method according to claim 15, which comprises starting from particles having a size within the range of 0.05 - 1.0 μm.

17. A method according to claim 9, which comprises forming the grains by means of screening a particle mass that is bonded together by adsorbed moisture.

18. A method according to claim 9, which comprises forming the grains by adding a binder.

19. A method according to claim 18, wherein said binder is water.

20. A method according to claim 18, wherein said binder is polyvinyl alcohol.

21. A method according to claim 18, wherein the grains are formed by screening a slurry containing said binder.

22. A method according to claim 18, wherein the grains are formed by spray-drying a slurry containing said binder.

23. A method according to claim 9, which comprises forming the grains in the presence of a spacer forming material.

24. A method according to claim 23, wherein the spacer forming material is ammonium carbonate.

25. A method according to claim 9, which comprises stabilizing before the heating in a reducing atmosphere, the formed grains by means of a treatment in air or an inert atmosphere at a temperature within the range of 600° - 1200° C.

26. A method according to claim 25, which comprises performing the stabilisation at a temperature within the range of 850° - 1100° C.

27. A method according to claim 9, which comprises using hydrogen at the heating of the grains in a reducing atmosphere and performing the reduction to a degree of reduction >95%.

28. A method according to claim 9, which comprises performing the heating in a reducing atmosphere at a temperature within the range of 500° - 800° C.

29. A method according to claim 28, which comprises maintaining the temperature within the range of 650° - 750° C.

30. A method according to claim 9, which comprises performing the pressing operation at a pressure within the range of 150 - 1000 kp/cm$^2$.

31. A method according to claim 30, which comprises maintaining the pressure within the range of 250 - 500 kp/cm$^2$.

32. A method according to claim 30, which comprises performing the sintering operation at a temperature within the range of 600° - 750° C.

33. A method according to claim 9, which comprises forming grains containing up to 10% by weight, preferably 2 - 7% by weight, based on the total weight of the active electrode material of copper particles.

34. In a method of preparing a porous electrode for a chemo-electric cell, comprising reduced and sintered together particles of iron as an active electrode material, by starting from particles of iron oxide as a reducible compound and heating the same in a reducing atmosphere for reduction thereof and pressing and sintering the reduced compound into a coherent electrode body, the improvement which comprises forming from the particles, before the heating in a reducing atmosphere, porous grains having a relatively homogeneous size, heating the grains in a reducing atmosphere at the sintering temperature of the electrode material, whereby the particles within each grain sinter together, and pressing and sintering the reduced grains, the pressing being performed at a pressure of at most 1000 kp/cm$^2$, to form a porous, coherent electrode body which after sintering shows inelastically deformed contact area between the grains and a ratio between the average size of the pores within the electrode body and the average size of the pores within the grains above 1:1 and at most 40:1.

35. A chemo-electric cell which contains a porous electrode according to claim 1.

36. A method of preparing a porous metal powder, which comprises starting from particles of a reducible metal compound and forming from said particles porous grains having a relatively homogeneous size and heating the formed grains in a reducing atmosphere at sintering temperature, whereby the particles within each grain sinter together.

37. A method according to claim 36, which comprises forming porous grains of which a group consisting of at least 70% of the total number of grains have a size where the largest size is at most twice the size of the smallest one.

38. A method according to claim 36, wherein the metal powder is iron powder and the reducible compound is iron oxide.

39. A method according to claim 38, which comprises forming grains having a size within the range of 1 - 500 μm.

40. A method according to claim 39, which comprises forming grains having a size within the range of 50 – 250 μm.

41. A method according to claim 39, which comprises starting from particles having a size below 10 μm.

42. A method according to claim 41, wherein the size is below 3 μm.

43. A method according to claim 42, wherein the size is within the range of 0.05 – 1.0 μm.

44. A method according to claim 36, which comprises forming the grains by means of screening a particle mass that is adhered together by adsorbed moisture.

45. A method according to claim 36, which comprises forming the grains by adding a binder.

46. A method according to claim 45, wherein the binder is water.

47. A method according to claim 45, wherein the binder is polyvinyl alcohol.

48. A method according to claim 45, wherein the grains are formed by screening a slurry containing said binder.

49. A method according to claim 45, wherein the grains are formed by spray drying a slurry containing said binder.

50. A method according to claim 36, which comprises forming the grains in the presence of a spacer forming material.

51. A method according to claim 50, wherein the spacer forming material is ammonium carbonate.

52. A method according to claim 36, which comprises stabilizing the formed grains before the heating in a reducing atmosphere, by a treatment in air or an inert atmosphere at a temperature within the range of 600° – 1200° C.

53. A method according to claim 52, wherein the stabilisation is performed at a temperature within the range of 850° – 1100° C.

54. A method according to claim 36, which comprises using hydrogen at the heating of the grains in a reducing atmosphere and performing the reduction to a degree of reduction >95%.

55. A method according to claim 36, which comprises performing the heating in a reducing atmosphere at a temperature within the range of 500° – 800° C.

56. A method according to claim 55, which comprises maintaining the temperature within the range of 650° – 750° C.

57. The electrode of claim 1 wherein a group of grains which comprises at least 70% of the total number of grains have a size wherein the largest grain is at most twice the size of the smallest grain.

58. The electrode of claim 57 wherein the grains are substantially spherical.

59. The method of claim 10 wherein the grains are substantially spherical.

* * * * *